Feb. 2, 1943.   A. J. BASTIAN   2,310,053
BEARING ASSEMBLY
Filed May 28, 1942
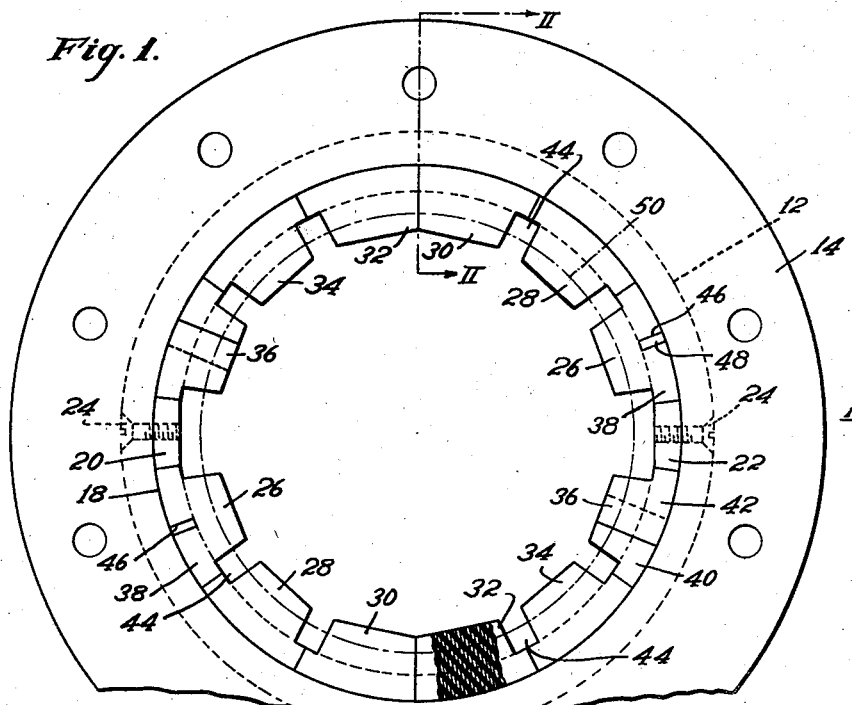
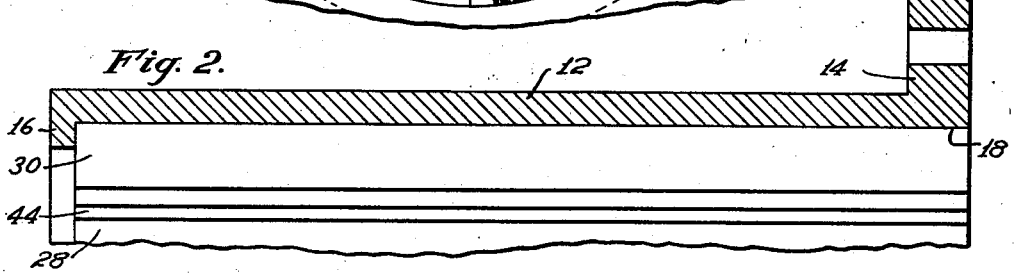
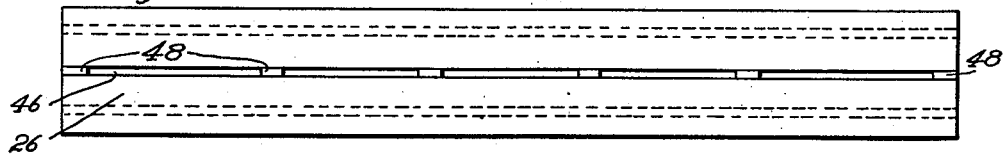
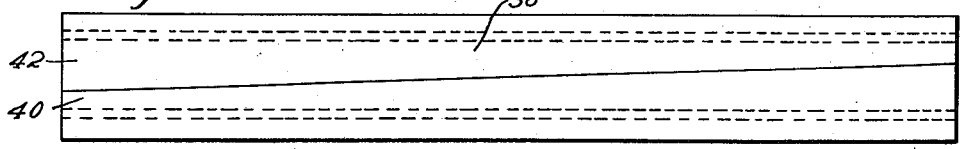
WITNESSES:
Edward Michaels
INVENTOR
Arthur J. Bastian.
BY
James K. Ely
ATTORNEY Patented Feb. 2, 1943

2,310,053

UNITED STATES PATENT OFFICE 2,310,053

BEARING ASSEMBLY

Arthur Joseph Bastian, East Orange. N. J., assignor to Westinghouse Electric & Manufacturing Company, East Pittsburgh, Pa., a corporation of Pennsylvania Application May 28, 1942, Serial No. 444,773

9 Claims. (Cl. 308—238)

This invention relates generally to bearings, and more particularly to composition bearing assemblies.

In the marine industry, stern tube bearings having bronze bushings for supporting lignum vitae or molded rubber staves have been widely employed. The staves of these bearings are separated by metal ribs which are formed in the bearing bushing as an integral part thereof. Such bushings are generally produced in the foundry by employing special sand cores, and usually have to be machined to provide for seating the staves. In addition, the individual staves have to be keyed or otherwise retained in operative position between the ribs. These different operations and particularly the preparation of the bushing for receiving the staves greatly increase the cost of the bearing assembly.

An object of this invention is to provide a bearing assembly of the stern tube type having a simplified construction.

Another object of this invention is to provide a bearing assembly of the stern tube type having staves of molded composition assembled to seat in operative position on a smooth bore housing.

A further object of this invention is to provide for compensating for the expansion of a bearing of molded composition under predetermined conditions.

Other objects of this invention will become apparent from the following description when taken in conjunction with the accompanying drawing in which:

Figure 1 is a view in elevation and partly in section of a bearing embodying the teachings of this invention;

Fig. 2 is a view in section taken along the line II—II of Fig. 1;

Fig. 3 is a bottom plan view of one of the staves utilized in forming the bearing assembly of Fig. 1; and Fig. 4 is a bottom plan view of another stave utilized in forming the bearing assembly of Fig. 1.

Referring to Fig. 1 of the drawing, this invention is illustrated by reference to a bearing assembly 10. A housing or bushing 12 of bronze or any other suitable material is utilized for supporting the bearing material, an outwardly extending flange 14 being provided at one end thereof to facilitate the mounting of the assembly 10. At the other end of the bushing 12 an inwardly projecting flange or stop 16 is provided for cooperating with the bearing material to limit longitudinal movement thereof. The bushing 12 is also provided with a bore 18, the surface of which is preferably machined smooth.

As illustrated, a pair of keeper strips 20 and 22 are disposed to seat diametrically opposite one another on the smooth surface of the bore 18, and are secured in position by means of the screws 24 which project through the housing or bushing into the keeper strips. The keeper strips are elongated and extend longitudinally of the bore and preferably are of a length sufficient to extend from one end of the bushing to the other.

In order to provide a suitable bearing surface for a shaft (not shown), a group of elongated staves is seated on the smooth bore 18 between the keeper strips 20 and 22 on each half of the bore.

In the embodiment illustrated each group comprises six staves identified as 26, 28, 30, 32, 34 and 36. The corresponding staves of each group are preferably diametrically opposite one another for purpose of balance.

Each of the staves and keeper strips are preferably formed of laminated fibrous material such as paper, duck, or other cloth fabrics or fiber glass cloth impregnated with a resinous binder such as a phenolic, urea, vinyl or other resin or resinous mixtures consolidated under heat and pressure into a strong body. The choice of the fibrous material and the resinous binder utilized therewith depends upon the characteristics which it is required to develop in the bearing material. Where desired, the staves may be formed of the bearing material disclosed and claimed in Patent No. 2,162,890, issued June 20, 1939, to Horne et al., or in the application Serial No. 342,933 of R. W. Auxier, filed June 28, 1940, and assigned to the assignee of this invention. After having been consolidated the formed laminated body is machined to the predetermined and required shape of the stave, the staves being so machined, however, that the laminations of fibrous material extend substantially perpendicular to the base of the stave to present edges as the bearing surfaces.

Referring to Fig. 1, each of the formed bodies of laminated material is machined to have a base portion 38, the curvature of the base being of the same curvature as the smooth bore 18 of the bushing. In the embodiment illustrated, the staves 26, 28, 34 and 36 of each of the groups have substantially the same cross-sectional shape while the staves 30 and 32 have substantially reverse cross-sectional areas. Stave 36, however, of each of the groups, is formed of two complementary tapered bodies 40 and 42, as more clearly shown in Fig. 4, and is utilized for wedging the other staves of the group in operative position between the keeper strips 20 and 22.

Each of the staves of the different groups, with the exception of staves 30 and 32, and the tapered edges of stave 36 are notched at their adjacent edges to provide grooves 44 between the adjacent staves when assembled in edge to edge contact in the bushing. The grooves 44 function as lubricating grooves, and are of a depth sufficient to provide proper lubrication for the bearing surfaces. In the embodiment illustrated, the grooves 44 extend to a depth substantially equal to the distance between the outer surfaces of the keeper strips and the bearing surfaces.

Prior to assembling the staves of each group, an elongated slot 46 is provided in the base portion of stave 26, the slot 46 extending for the length of the stave and into the stave a distance substantially equal to the distance between the base of the stave and the base of the notch forming the water groove between the staves. As more clearly illustrated in Fig. 3, a plurality of support members 48 of the same material as the staves are disposed in spaced relation in the slot 46 to provide supported areas for the sides of the elongated slot and to prevent the slot from closing when the staves are assembled and wedged between the keeper strips. The support members 48 preferably are of a thickness substantially equal to the width of the slot 46 to provide a tight fit therewith and have their laminations substantially parallel to the laminations of the stave.

With the sides of the staves machined to shape, the staves of each group are assembled in position between the keeper strips 20 and 22 with their bases seating on the smooth bore and their sides in edge to edge contact. When the tapered section 42 of the stave 36 is forced into position, it is found that the staves of the group are retained in operative position between the keeper strips 20 and 22. After each group of staves have been assembled in the bushing, the inwardly projecting ends of the staves are machined to give a predetermined bearing surface represented by the line 50 to provide slightly curved bearing surfaces of a diameter sufficient for seating a shaft (not shown) thereon. In machining the assembled staves, the support members 48 in the slot 46 aid in maintaining the assembly intact for the boring or machining the bearing to size.

In operation where water or an emulsion of water and oil is used as a lubricant, it is found that the grooves 44 function to supply sufficient lubricant to the machined bearing surfaces. When exposed to such lubricants, the staves expand somewhat, the expansion being greatest in the direction perpendicular to the plane of the laminations of the stave. However as the staves expand, the slot 46 in one of the staves of each of the groups closes to so relieve the pressure against the keeper strips, that the expansion will not effect a buckling or distortion of the staves forming the bearing surfaces. Because of the inclusion of the support members 48 in the slot 46, the side walls of the slot are sufficiently supported that the expansion of the members will not effect a complete closing of the slot. The support members 48 also cooperate with the slot to localize the pressure points as the result of expansion of the staves.

Different modifications of the arrangement of the keeper strips and staves are possible and, in fact, are necessitated by the size of the bearing assembly and are, therefore, clearly contemplated as within the scope of this invention. For example although each keeper strip of the embodiment illustrated is a single elongated body, where the size of the bearing assembly demands a keeper strip of large cross-sectional area, two or more elongated strips may be employed and secured to the bushing in edge-to-edge contact in forming each of the keeper strips. Likewise, the number of staves of each of the groups and the shape and size of the lubricating grooves and the expansion slot may be varied somewhat, depending upon the size of the bearing required.

With this arrangement of the staves, it is possible to remove one of the groups without disturbing the other group so that repairs can very easily be made to only a part of the bearing where necessary. The bearing assembly of this invention is easily constructed, and, by reason of the laminated material employed with the laminations provided edge bearing surfaces, has a relatively long life. Further by utilizing the smooth bore bushing it is possible to provide a large and substantially uniform bearing area, for the use of the elongated bearing staves removes any necessity for butt joints along the bearing surface of the staves. The assembly of the bearing is simplified requiring no complicated machining operations.

While this invention has been described with reference to a particular embodiment thereof, it is, of course, not to be limited thereto except in so far as is necessitated by the scope of the appended claims.

I claim as my invention:

1. A bearing assembly comprising, in combination, a housing, a plurality of keeper strips secured to the housing in spaced relation to one another, a plurality of staves having bearing surfaces and base portions disposed between the keeper strips with their bases in edge to edge contact seating against the housing, each of the staves comprising a strong body consolidated from laminated fibrous material impregnated with heat-hardening resinoid, grooves disposed between certain of the staves at the bearing surfaces to provide lubricating channels, and a slot in the base portion of one of the staves between the keeper strips to compensate for expansion of the staves under predetermined conditions, the slot extending into the stave a distance substantially equal to the distance between the base of the stave and the lubricating groove at the edge to edge contact between the staves.

2. A bearing assembly comprising, in combination, a housing having a smooth bore, a pair of keeper strips secured in the housing to seat on the smooth bore diametrically opposite one another, a plurality of staves having bearing surfaces and base portions disposed between the keeper strips with their bases in edge to edge contact seating on the smooth bore of the housing, each of the staves comprising a strong body consolidated from laminated fibrous material impregnated with synthetic resin, the laminations of the staves extending substantially perpendicular to the base portion to present edges forming the bearing surfaces, grooves disposed between certain of the staves at the bearing surfaces to provide lubricating channels, and a slot in the base portion of one of the staves of each group between the diametrical opposite keeper strips to compensate for expansion of the staves under predetermined conditions, the slot extending into the stave a distance substantially equal to the distance between the base of the stave and the lubricating groove at the edge to edge contact between the staves.

3. A bearing assembly comprising, in combination, a housing, a plurality of keeper strips secured to the housing in spaced relation to one another, a plurality of elongated staves having bearing surfaces and base portions disposed between the keeper strips with their bases in edge to edge contact seating against the housing, each of the staves comprising a strong body consolidated from laminated fibrous material impregnated with heat-hardening resinoid, the laminations of the staves extending substantially perpendicular from the base portion in the lengthwise direction of the stave to present edges forming the bearing surfaces, grooves disposed between certain of the staves at the bearing surfaces to provide lubricating channels, and an elongated slot in the base portion of one of the staves between the keeper strips to compensate for expansion of the staves under predetermined conditions, the slot extending into the stave a distance substantially equal to the distance between the base of the stave and the lubricating groove at the edge to edge contact between the staves.

4. A bearing assembly comprising, in combination, a housing, a plurality of keeper strips secured to the housing in spaced relation to one another, a plurality of staves having bearing surfaces and base portions disposed between the keeper strips with their bases in edge to edge contact seating against the housing, each of the staves comprising a strong body consolidated from laminated fibrous material impregnated with heat-hardening resinoid, the laminations of the staves extending substantially perpendicular from the base portion to present edges forming the bearing surfaces, grooves disposed between certain of the staves at the bearing surfaces to provide lubricating channels, an elongated slot in the base portion of one of the staves between the keeper strips disposed to extend the length of the stave, the slot extending into the stave a distance substantially equal to the distance between the base of the stave and the lubricating groove at the edge to edge contact between the staves, and a plurality of supporting members disposed in spaced relation in the elongated slot to prevent closure of the slot under pressure, the slot and support members cooperating to compensate for expansion of the staves under predetermined conditions.

5. A bearing assembly comprising, in combination, a housing having a smooth bore, a pair of elongated keeper strips secured in the housing to seat on the smooth bore diametrically opposite one another, a plurality of elongated staves having bearing surfaces and base portions disposed between the keeper strips with their bases in edge to edge contact seating on the smooth bore of the housing, each of the staves comprising a strong body consolidated from laminated fibrous material impregnated with synthetic resin, the laminations of the staves extending substantially perpendicular to the base portion in the lengthwise direction of the stave to present edges forming the bearing surfaces, grooves disposed between certain of the staves at the bearing surfaces to provide lubricating channels, and an elongated slot in the base portion of one of the staves of each group between the diametrical opposite keeper strips to compensate for expansion of the staves under predetermined conditions, the slot extending into the stave a distance substantially equal to the distance between the base of the stave and the lubricating groove at the edge to edge contact between the staves.

6. A bearing assembly comprising, in combination, a housing having a smooth bore, a pair of keeper strips secured in the housing to seat on the smooth bore diametrically opposite one another, a plurality of staves having bearing surfaces and base portions disposed between the keeper strips with their bases in edge to edge contact seating on the smooth bore of the housing, each of the staves comprising a strong body consolidated from laminated fibrous material impregnated with synthetic resin, the laminations of the staves extending substantially perpendicular to the base portion to present edges forming the bearing surfaces, grooves disposed between certain of the staves at the bearing surfaces to provide lubricating channels, an elongated slot in the base portion of one of the staves of each group between the diametrically opposite keeper strips disposed to extend the length of the stave, the slot extending into the stave a distance substantially equal to the distance between the base of the stave and the lubricating groove at the edge to edge contact between the staves, and a plurality of supporting members disposed in spaced relation in the elongated slot to prevent closure of the slot under pressure, the slot and support members cooperating to compensate for expansion of the staves under predetermined conditions.

7. A bearing assembly comprising, in combination, a housing having a smooth bore, a pair of keeper strips secured in the housing to seat on the smooth bore diametrically opposite one another, a group of staves having bearing surfaces and base portions disposed on each of the opposite sides of the bore between the keeper strips, the staves of each group being wedged in assembled relation between the keeper strips with their bases in edge to edge contact seating on the smooth bore of the housing, each of the staves comprising a strong body consolidated from laminated fibrous material impregnated with synthetic resin, the laminations of the staves extending substantially perpendicular to the base portion to present edges forming the bearing surfaces, the groups of staves being removable from the housing independently of one another and the keeper strips to facilitate replacement of the staves of any of the groups, grooves disposed between certain of the staves of different groups at the bearing surfaces to provide lubricating channels, and a slot in the base portion of one of the staves of each group disposed to compensate for expansion of the staves under predetermined conditions to prevent distortion of the bearing surfaces, the slot extending into the stave a distance substantially equal to the distance between the base of the stave and the lubricating groove at the edge to edge contact between the staves.

8. A bearing assembly comprising, in combination, a housing having a smooth bore, a keeper strip carried by the housing, a plurality of staves having bearing surfaces and base portions disposed with their bases in edge-to-edge contact seating against the housing on opposite sides of the keeper strip, each of the staves comprising a strong body consolidated from laminated fibrous material impregnated with heat-hardening resinoid, grooves provided in the bearing surface formed by the staves to provide lubricating channels, and a slot in the base portion of one of the staves disposed to compensate for expansion of the staves under predetermined conditions.

9. A bearing assembly comprising, in combination, a housing having a smooth bore, a plurality of keeper strips carried by the housing, a plurality of staves having bearing surfaces and base portions disposed between the keeper strips with their bases in edge-to-edge contact seating against the housing, each of the staves comprising a strong body consolidated from laminated fibrous material impregnated with heat-hardening resinoid, grooves provided in the bearing surface formed by the staves to provide lubricating channels, and a slot in the base portion of one of the staves between the keeper strips disposed to compensate for expansion of the staves under predetermined conditions.

ARTHUR JOSEPH BASTIAN.